Patented Mar. 10, 1942

2,276,120

UNITED STATES PATENT OFFICE 2,276,120

CHEMICAL REACTION CONTROL

Charles L. Thomas, Chicago, Ill., assignor to Universal Oil Products Company, Chicago, Ill., a corporation of Delaware No Drawing. Application July 8, 1940, Serial No. 344,374

8 Claims. (Cl. 23—1)

This invention relates to improved media useful as heat exchange materials and is a continuation-in-part of my co-pending application Serial No. 274,976, filed May 22, 1939. More particularly it relates to a material useful in catalytic reactions for the storing and utilization of the heat evolved in an exothermic reaction for use in carrying out endothermic reactions. The invention relates especially to the use of a low melting mixture comprising metal halides.

The invention is particularly useful when employed in connection with reactions wherein the exothermic reaction and the endothermic reaction are of the same order of magnitude insofar as heat evolution and consumption are concerned, and wherein the temperatures at which these reactions take place are within the same approximate range.

Among the types of processes in which the present invention is usefully employed are catalytic cracking, catalytic dehydrogenation, cyclization of aliphatic hydrocarbons, etc. All of these reactions are endothermic in character and during the course of the conversions are accompanied by the deposition of non-volatile carbonaceous material on the catalytic masses used to assist the conversion. It is common practice to remove the carbonaceous deposits from the catalyst surfaces by heating the catalytic masses at temperatures in excess of 500° C. in the presence of oxygen-containing gases, whereby the carbon is oxidized to carbon monoxide and carbon dioxide. This reaction is accompanied by an evolution of heat which must be conducted from the system to prevent damage to both the equipment and the catalyst masses. In many cases, the heat evolved during this reactivation step is sufficient or nearly sufficient to supply that required for the processing step. Normally in carrying out catalytic processes of this type, the processing and reactivation steps are carried out alternately in the form of a cycle wherein the processing reaction is carried out for a definite period of time, and the reactivation step is carried out for another definite period of time, which may be the same as that for processing or may be different. In many instances, apparatus is arranged in duplicate so that the reactivation step is carried out in one apparatus while the processing step is being carried out in a companion apparatus. In other types of operation, the cycle is carried out in a single reactor, wherein the process period and regeneration period are alternated at regular intervals.

In one specific embodiment the present invention comprises heat exchange media consisting of mixtures of stannous chloride with an anhydrous metal halide, said mixture having a melting point below that at which the reaction in which it is to be used occurs and preferably below 450° C., said mixtures being particularly useful for removing heat during an exothermic reaction and using said heat in an endothermic reaction.

The mixtures used in the present invention and which may comprise eutectics as well as other mixtures should desirably have the following characteristics:

(1) A low melting point whereby they can be maintained in the liquid state at relatively low temperatures when not in actual use. If the melting point is too high, difficulties may arise either in pumping or in otherwise handling, due to freezing. The melting point must necessarily be well below the temperature at which they are used.

(2) The salt mixture should be thermally stable at any temperature which is likely to be reached during the course of the reaction. Normally this includes temperatures up to 600° C. or higher.

(3) They should be stable in contact with air or minor amounts of moisture, and should not form high melting products in contact with these materials at ordinary or elevated temperatures for long periods of time.

(4) The mixtures should be non-corrosive to ordinary steel or ferro-alloy equipment. This is, of course, essential both from the standpoint of the equipment involved, and loss of chemicals which might occur due to failure of the equipment during the process.

(5) The constituents should not react with explosive violence with hydrocarbons in case of accidental contact therewith such as might be caused by failure of the equipment, or due to contamination of the salt mixture with organic materials under any circumstances.

(6) The constituents of the mixture should be relatively inexpensive.

(7) The boiling point should be well above the temperatures likely to be reached during any step of the process in which it is employed. Likewise, the vapor pressure should be low so that high pressures need not be applied to maintain the material in substantially liquid form.

(8) The material should have high specific heat, giving good heat storage capacity, and high degree of heat conductivity.

(9) It should be relatively non-poisonous and non-corrosive to the skin so that it does not introduce undue hazards during handling.

An example of materials of this nature is stannous and zinc chloride in the quantities of 56.1 mol % and 43.9 mol % respectively, having a melting point of 171° C. Another example is stannous chloride, 78.3 mol % and cuprous chloride 21.7 mol %, having a melting point of 171.7° C. Obviously, the melting points of the combinations will vary with the materials used and with the proportions used, the above combinations being given for illustration only. The melting points can be varied still further by the addition of a third component, and the use of stannous chloride with two or more added metal halides is included within the scope of the invention. Although it is preferred to employ mixtures having melting points below approximately 450° C., any mixture melting substantially below the temperatures at which the various reactions in which it is to be used occurs may be used.

The relatively low melting points of these mixtures permit their being maintained in liquid form by moderate heating, and in many cases high pressure steam is sufficient so that the danger of freezing of lines, and solidification of the salt in pumps and other parts of the equipment is minimized by the relatively simple procedure of jacketing the parts containing the molten salt and circulating a heated medium.

The apparatus which may be used is not a special feature of the invention, but may comprise any suitable type of equipment wherein a catalytic reaction involving an endothermic reaction may be carried out simultaneously with the carrying out of an exothermic reaction, and permitting the transfer of heat through the medium of a molten salt from one to the other. This may comprise separate reactors which are operated in cycles of alternating periods, and wherein the molten salt surrounds the tubes of chambers wherein the catalyst is disposed, means being provided for the pumping of the molten salt from a region of high temperature to a region of lower temperature, and vice versa. In another type of equipment, the reactor may comprise a multiplicity of tubes containing catalytic masses, the tubes being arranged so that a part are in the process stage while the remainder are in the reactivation stage. The heat exchange medium surrounds the tubes and is circulated by mechanical means. Another type of reactor may employ chambers, normally operated in pairs, wherein the catalyst mass is disposed. The heat exchange medium is circulated through tubes passing through the catalyst bed, and the molten salt from one reactor to another. Additional heat may be supplied or removed from the heat exchange medium by passage of a portion of the molten salt through heaters or coolers as may be desired.

Although the mixtures described herein are particularly useful in connection with catalytic reactions, it is intended that they shall be used as thermophoric materials generally.

I claim as my invention:

1. In a process for utilizing the heat evolved during an exothermic reaction for carrying out an endothermic reaction by using a heat exchange medium, the improvement which comprises using a mixture of stannous chloride with an anhydrous metallic halide, said mixture melting below 1000° C.

2. In processes for using the heat of reaction in an exothermic reaction to supply the heat for an endothermic reaction, the improvement comprising using a binary mixture of stannous chloride and an anhydrous metal halide as the heat carrying material, said mixture melting below 1000° C.

3. In processes for using the heat of reaction in an exothermic reaction occurring at a temperature in excess of 500° C. to supply the heat for an endothermic catalytic reaction occurring at a temperature in excess of 450° C., the improvement comprising the use of a mixture of stannous chloride with an anhydrous metallic halide, said mixture having a melting point below 450° C. as a heat exchange medium.

4. In processes for utilizing the heat of reaction from an exothermic reaction occurring at a temperature in excess of about 500° C. for carrying out a reaction occurring at a temperature in excess of about 450° C., the improvement which comprises the use of a mixture of stannous chloride and anhydrous metallic halides, said mixture having a melting point below 450° C., as a heat exchange medium.

5. In a process for utilizing the heat evolved during the reactivation of a carbonized catalytic mass for carrying out an endothermic catalytic reaction, the improvement which comprises using a mixture of stannous chloride and an anhydrous metallic halide as a heat carrying medium, said mixture melting below 450° C.

6. The porcess of claim 1 wherein the mixture of salts is a eutectic mixture.

7. The process of claim 1 further characterized by using a mixture of stannous chloride and an anhydrous bi-valent metallic halide.

8. In processes for using the heat of reaction of an exothermic reaction to supply the heat for an endothermic change occurring at a temperature substantially below said exothermic reaction, the improvement comprising the use of a mixture of stannous chloride with an anhydrous metallic halide as a heat exchange medium, said mixture melting below the temperature at which said endothermic change occurs.

CHARLES L. THOMAS.